May 5, 1953  J. L. RUDY ET AL  2,637,075
COTTON LINT CONDITIONING MACHINE
Filed Nov. 26, 1946  2 SHEETS—SHEET 1

Inventors
JOHN LEVI RUDY
WILLIAM C. PITTS

Attorneys

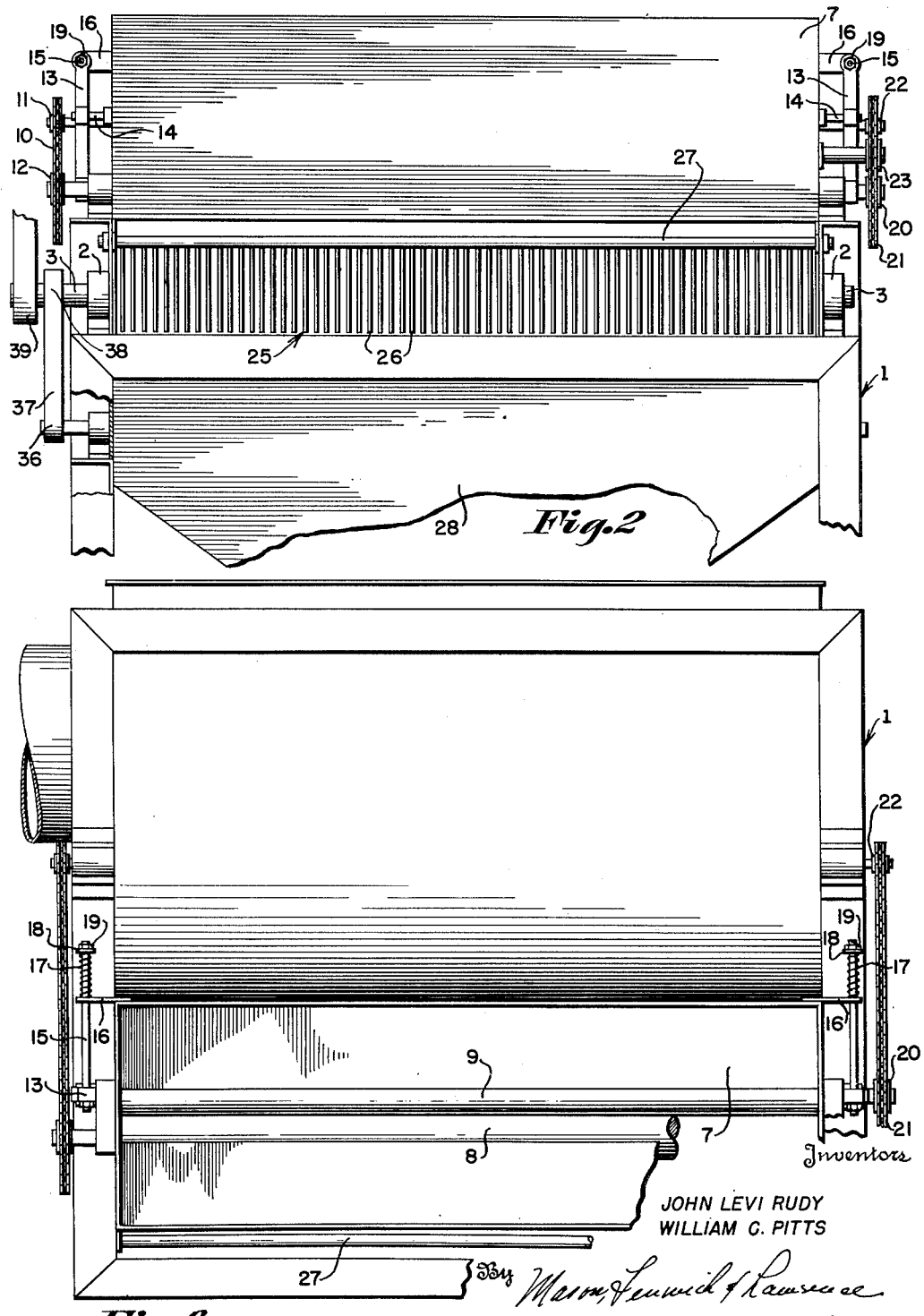

Patented May 5, 1953

2,637,075

UNITED STATES PATENT OFFICE 2,637,075

COTTON LINT CONDITIONING MACHINE

John Levi Rudy and William Columbus Pitts, Memphis, Tenn.

Application November 26, 1946, Serial No. 712,424

2 Claims. (Cl. 19—96)

This invention relates to cotton lint conditioning machines, and more particularly to such devices for conditioning cotton lint subsequent to ginning.

Since the advent of mechanical cotton pickers, cotton reaching the gin house is exceedingly rough and contains excessive amounts of dirt and trash. The amount of trash is so great that the lint coming from the gin is not entirely clean, and, therefore, not properly conditioned for spinning or other processing. In addition the ginned cotton is much rougher than the lint obtained from hand picked cotton.

The object of the present invention is to provide a machine for conditioning cotton after ginning, wherein the lint is given a supplemental cleaning and combing to fit it for further processing.

Another object of the invention is to provide such a machine using a saw cylinder to comb the cotton from a bat for cleaning, with the saws forming the cylinder being so shaped that the cylinder when rotating at relatively high speeds will present a substantially solid drum of teeth to comb the entire bat and to prevent cutting or scoring the bat.

A further object of the invention is to provide such a machine in which the lint is combed just prior to being removed from the saws to ensure an unrough condition of the lint when it emerges from the machine.

Other objects of the invention will be apparent from the following detailed description of the invention, taken in conjunction with the drawings which accompany and form a part of this specification.

In the drawings:

Figure 2 is a partial front view of the machine;

Figure 3 is a plan view, parts being broken away;

Figure 1:
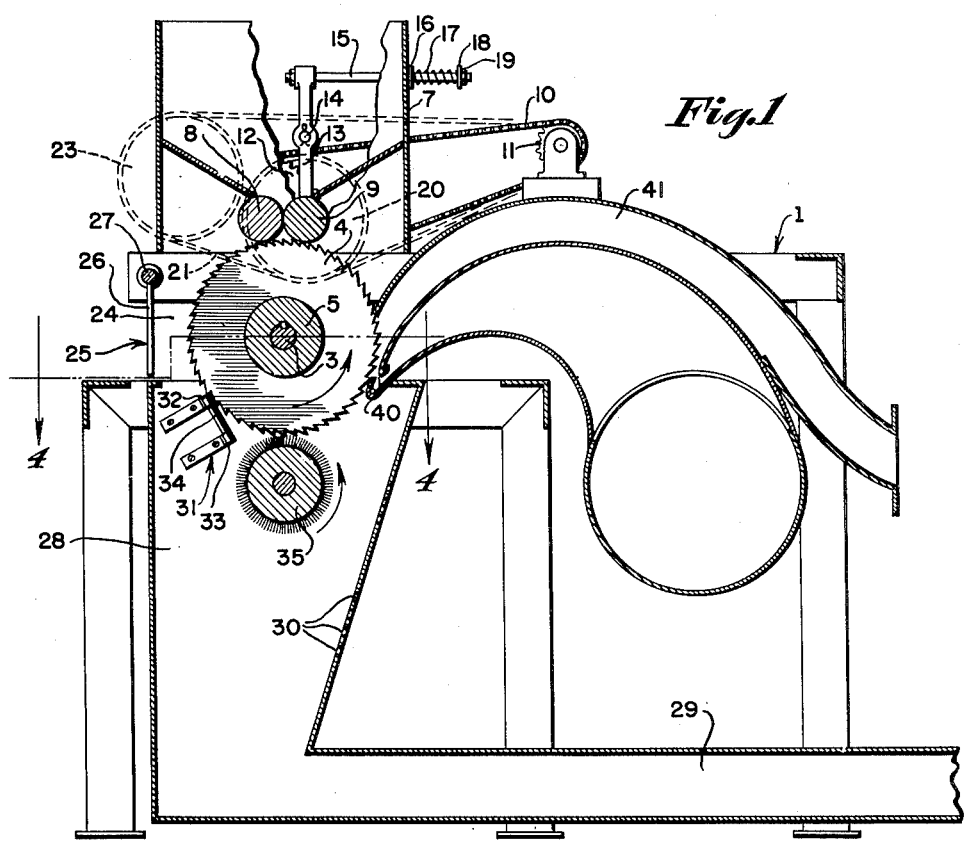
Figure 1 is a vertical section through a cotton conditioner embodying the principles of the present invention.
Figure 4:
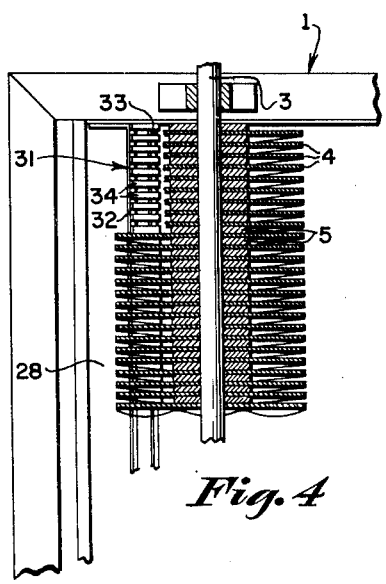
Figure 4 is a horizontal section taken on the line 4—4 of Figure 1.

Referring to the drawings in detail, the machine is mounted upon a suitable frame structure 1, which supports the various shafts and other elements of the machine, and upon which end closure plates for the different chambers may be mounted.

Figure 5:
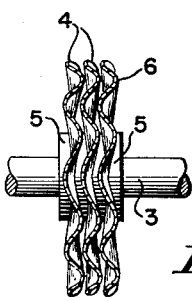
Figure 5 is a detail view of a portion of the saw drum showing the shape of the saws used.

Supported in bearings 2 mounted on frame 1 is a saw shaft 3, carrying a plurality of spaced saws 4, the spacing being determined by the usual spacer blocks 5. The saws 4 have portions 6 which are bent out of the normal vertical plane of the saws a distance at least equal to the spacing between the saws. This may take several different forms. As shown somewhat exaggerated the periphery of the saw is fluted, as at 6, so that when viewed as in Figure 5 the edge of the saw follows a wavy or undulating path. It is obvious that the entire blade of the saw may be canted to accomplish the same result. With this arrangement, and the saw cylinder rotating at a relatively high rate of speed, a substantially solid cylindrical surface of teeth is presented to the cotton under treatment. This reduces the possibility of cutting a groove in the cotton bat, and ensures even accumulation of the cotton from the bat being fed into the machine.

Located just above the saw cylinder and at the outlet opening of a feed hopper 7, is a pair of corrugated feed rollers 8 and 9, the rollers serving to draw cotton lint, which has previously been ginned, from the hopper, form it into a bat as it passs between them, and feed the formed bat to the saw cylinder. Roller 8 is journaled in bearings on the frame, and driven by means of a chain 10, the chain passing around a sprocket 11 on a conventional feed drive and sprocket 12 on the end of roller shaft 8. As viewed in Figure 1, roller 8 will rotate in a clockwise direction, while roller 9 will rotate counterclockwise. Roller 9 is mounted for adjustment and yielding movement with respect to roller 8. To accomplish this, roller 9 is journaled at its ends in a pair of levers 13, the levers being pivoted intermediate their ends to the hopper casing, as at 14. The opposite ends of the levers are provided with rods 15 which project at an angle from the levers and pass through openings in bracket 16 secured to the hopper. The portion of each of the rods beyond brackets 16 carries a spring 17 which is compressed between the brackets and washers 18 adjustably positioned on the rods by means of nuts 19 threaded on the ends of the rods. Adjustment of nuts 19 controls the pressure of spring 17 and thus determines the thickness and compression of the bat fed to the saw cylinder by the rollers 8 and 9. Spring 17 will yield, permitting roller 9 to move away from roller 8 and thus allow the passage of a knot of lint or a foreign body between the rollers to the cleaning chamber.

On the opposite side of the machine from sprocket chain 10, roller 9 is provided with a sprocket 20. A chain 21 passes over sprocket 20, a drive sprocket 22 on the feed drive rotating in the proper direction, and an idler sprocket 23 mounted on the side of hopper 7, to the side of and slightly above sprocket 20. By this arrangement sprocket 20 will be kept in engagement with chain 21 when roller 9 rocks about its pivot 14.

The saw cylinder is contained within a cleaning chamber 24, the front of which is closed by means of a grill 25 composed of spaced vertical rods 26 depending from a horizontal shaft 27. Grill 25 permits motes thrown off by the saw to pass out of the machine. The lower portion of the saw cylinder is within the top of an overflow hopper 28 which is open to the cleaning chamber and receives excess cotton taken off by the saws and rejected lumps or knots of cotton, and transports this cotton through suction pipe 29 to a storage bin (not shown) for re-processing in the machine. The side wall of the hopper is perforated as at 30, to permit small particles of trash to sift through.

Positioned in the mouth of the overflow hopper 28 and adjacent the periphery of the saw cylinder is a breaker bar 31 comprising a pair of spaced horizontal bars 32 and 33 having a plurality of spaced connecting strips 34. The upper bar 32 is positioned quite close to the saw cylinder, and the entire assembly is arranged tangentially to the saws. The strips on the breaker bar catch and pull uncombed lumps of cotton from the saw teeth, causing them to fall into the overflow hopper for recirculation through the machine.

A circular brush 35 is mounted for rotation directly below the saw cylinder. The brush shaft is journaled in bearings mounted on the frame, and carries on one end a pulley 36 which is driven by a belt 37 from a pulley 38 on the saw shaft 3. The saw shaft also carries a large pulley 39 which may be driven by means of a belt from any convenient source of power.

On the opposite side of the saw cylinder from the breaker bar 31 is an air nozzle 40 in conjunction with a lint flue 41, the nozzle and flue being of the type conventionally used in the well known "air blast" gins. The purpose of the nozzle is to direct a thin curtain of air tangentially against the teeth of the saws on the saw cylinder to remove the cotton from the teeth and to deposit it in the lint flue 41, where it is carried away by the current of air from the air nozzle.

In operation, previously ginned cotton lint is emptied into the hopper 7 either by automatic or manual means, the lint dropping down the sloping walls to the rollers 8 and 9. Rollers 8 and 9 being corrugated pick up the lint and form it into a thin bat for feeding to the saws. The saws rotating at relatively high speeds, approximately 900 R. P. M., comb the cotton from the bat, at the same time kicking out the motes which fly off tangentially through the grill 25 to the outside of the machine. As the saws rotate, centrifugal force will cause smaller motes to fly off to join those kicked out by the saws upon original contact with the bat. Lumps or knots of lint will be knocked from the saw teeth by contact with the breaker bar to fall into the overflow hopper and return to the filling hopper for additional combing action by the saws. In passing brush 35, the lint will be well brushed back on the teeth, removing any remaining small particles of trash and dirt as well as smoothing and straightening the lint to remove kinks which may remain. As the teeth pass nozzle 40 the lint is blown off into lint flue 41 to be carried off for baling or subsequent handling.

In the description and illustration herein, one conventional method of driving the moving parts has been shown for illustration only and any suitable driving means may be employed.

Although a preferred and practical embodiment of the invention has been disclosed, it will be obvious that many changes may be made from the exact details shown without departing from the scope of the appended claims.

Having thus described my invention, what is claimed is:

1. A cotton lint conditioner comprising lint feeding means, a saw cylinder adjacent said feeding means, means to remove the lint from said saw cylinder, a stationary breaker bar, and a revolving brush, said breaker bar and said brush being positioned at spaced points adjacent the periphery of said saw cylinder and between said feeding means and said removing means.

2. In a cotton lint conditioner of that type having a lint feeding means, a saw cylinder adjacent said feeding means, and means to remove the lint from said saw cylinder, in combination; a breaker bar positioned closely adjacent the periphery of said saw cylinder between said feeding means and said removing means, said breaker bar comprising a pair of horizontally spaced bars parallel to the axis of said saw cylinder, and a plurality of spaced strips bridging the space between said bars and positioned between said bars and said saw cylinder.

JOHN LEVI RUDY.
WILLIAM COLUMBUS PITTS.

References Cited in the file of this patent

UNITED STATES PATENTS

| Number | Name | Date |
|---|---|---|
| 271,578 | Graner | Jan. 30, 1883 |
| 1,017,637 | Garner | Feb. 13, 1912 |
| 1,180,131 | Garner | Apr. 18, 1916 |
| 1,180,133 | Garner et al. | Apr. 18, 1916 |
| 1,401,439 | Pettit | Dec. 27, 1921 |
| 1,574,344 | Garner | Feb. 23, 1926 |
| 1,612,732 | Kinne | Dec. 28, 1926 |
| 1,906,811 | Purcell | May 2, 1933 |
| 2,418,694 | Brooks | Apr. 8, 1947 |